US008502725B2

(12) United States Patent
Yamamoto

(10) Patent No.: US 8,502,725 B2
(45) Date of Patent: Aug. 6, 2013

(54) MOTION CONTROLLED VEHICLE POWER ADAPTER

(75) Inventor: Yasuhiro Yamamoto, Los Angeles, CA (US)

(73) Assignee: Ever Win International Corporation, City of Industry, CA (US)

( * ) Notice: Subject to any disclaimer, the term of this patent is extended or adjusted under 35 U.S.C. 154(b) by 223 days.

(21) Appl. No.: 12/849,203

(22) Filed: Aug. 3, 2010

(65) Prior Publication Data

US 2012/0032830 A1 Feb. 9, 2012

(51) Int. Cl.
*H04L 17/02* (2006.01)

(52) U.S. Cl.
USPC .......... 341/176

(58) Field of Classification Search
USPC .......... 341/176
See application file for complete search history.

(56) References Cited

U.S. PATENT DOCUMENTS 6,927,675 B2 * 8/2005 Losee .......... 340/426.1
7,338,328 B2 * 3/2008 Krieger et al. .......... 439/668
7,595,719 B2 * 9/2009 Chen .......... 340/426.24
7,679,322 B1 3/2010 Griffin

* cited by examiner

*Primary Examiner* — Robert Pascal
*Assistant Examiner* — Khiem Nguyen
(74) *Attorney, Agent, or Firm* — Joe Nieh

(57) ABSTRACT

A motion controlled vehicle power adapter with a vehicle power adapter that can be plugged into the 12V vehicle power outlet and has a remote motion sensor at one end of the vehicle power adapter opposite the end that plugs into the 12 V vehicle power outlet. The remote motion sensor is operated by the operator's hand motion near the sensor without contacting the sensor. The remote motion sensor may be detachable from the vehicle power adapter. The operator's hand motions are translated into control signals and sent to a portable electronic device to control its functions. The control signals may be sent through a wire or wirelessly through a wireless transmitter.

12 Claims, 6 Drawing Sheets

Infrared Transmitter and Infrared Receiver; or
Short Range Infrared Transmitter and Short Range Infrared Receiver; or
Multiple Non-Contact Capacitance Sensor; or
Radio Transmitter and Receiver; or
Ultrasound Transmitter and Receiver

MOTION CONTROLLED VEHICLE POWER ADAPTER

BACKGROUND

1. Field of Invention

The present invention relates generally to controllers on a vehicle power adapter for controlling an electronic device. More specifically, the present invention relates to a vehicle power adapter with remote motion control to control a portable electronic device.

2. Description of Related Art

Many small portable electronic devices such as digital music players (e.g. iPods) are commonly used in a vehicle. The electronic devices are usually connected to a vehicle power adapter that is plugged into the vehicle's 12V power outlet for recharging in a vehicle. Most electronic devices are also capable of being used while being recharged in the vehicle.

The portable electronic devices usually have very small buttons for the control of its functions. The buttons may control functions such as power on/off, play, pause, stop, track forward, track backward, and volume increase/decrease. Due to the small size of the portable electronic devices, the buttons are also small and difficult to see. Most of the buttons on a portable electronic device are of similar size and shape, which makes it difficult to discern one button from another. This difficulty is exasperated in a moving vehicle while the operator is driving the vehicle.

Furthermore, the portable electronic device may be placed in various locations and in various positions and orientations in the vehicle while being used. The portable electronic device will shift its position and orientation while the vehicle is in motion due to the bumps on the road and the turning of the vehicle in different directions. When the operator attempts to operate the controls on the portable electronic device, the portable electronic devices may not be in the same location, position, or orientation as when the operator placed it initially. Also, once the portable electronic device is located and oriented, its controls are difficult to operate due to the various vibrations and motions in a moving vehicle. It takes fine finger muscle dexterity to accurately press the small buttons on the portable electronic device while the vehicle is moving. This forces the operator to take his eyes off the road to locate, orient, and control the portable electronic device while he is driving and creates a serious safety hazard both to the driver and to those around the vehicle.

The design shown in U.S. Pat. No. 7,679,322 attempts to minimize these problems. It succeeded in positioning the controls for the electronic device in a fixed location, namely, near the vehicle's power outlet, regardless of the position, location, or orientation of the portable electronic device. However, it failed to address the difficulties of the operation of the small buttons in a moving vehicle. Also, this design still requires the driver to take his eyes off the road to operate the several small buttons that are similar in size and shape.

BRIEF SUMMARY OF THE INVENTION

The motion controlled vehicle power adapter of the present invention is a vehicle power adapter that can be plugged into the 12V vehicle power outlet and has a remote motion sensor at the end of the vehicle power adapter opposite the end that plugs into the power outlet. The remote motion sensor is operated by the operator's hand motions near the sensor without contacting the sensor. The remote motion sensor may be detachable from the vehicle power adapter to be place at a different location. The operator's hand motions are translated into control signals and sent to a portable electronic device to control its functions. The control signals may be sent through a wire or wirelessly through a wireless transmitter.

An object of the present invention is to place the controls to a portable electronic device at a fixed remote position and orientation in a vehicle. Another object of the motion controlled vehicle power adapter is to provide a vehicle power adapter with remote controls for portable electronic devices. A further object of the motion controlled vehicle power adapter is to provide a vehicle power adapter with controls that can be operated remotely with hand motions without requiring the operator to press any small buttons. An additional object of the present invention is to provide a vehicle power adapter with controls for portable electronic devices that can be easily operated without requiring the operator to take his eyes off the road to operate the controls while driving.

DETAILED DESCRIPTION OF THE PREFERRED EMBODIMENT

The following description and figures are meant to be illustrative only and not limiting. Other embodiments of this invention will be apparent to those of ordinary skill in the art in view of this description.

Figure 1:
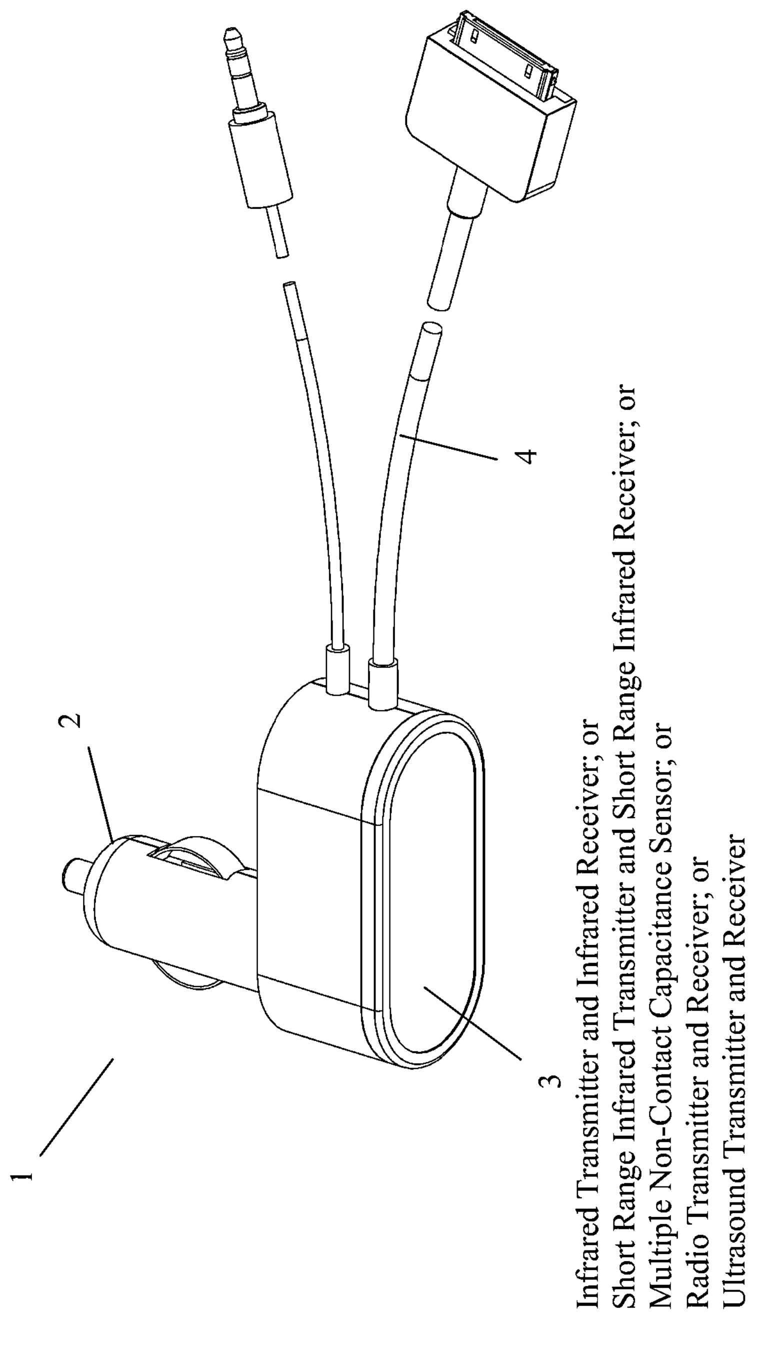
FIG. 1 shows a preferred embodiment of the motion controlled vehicle power adapter.
Figure 2:
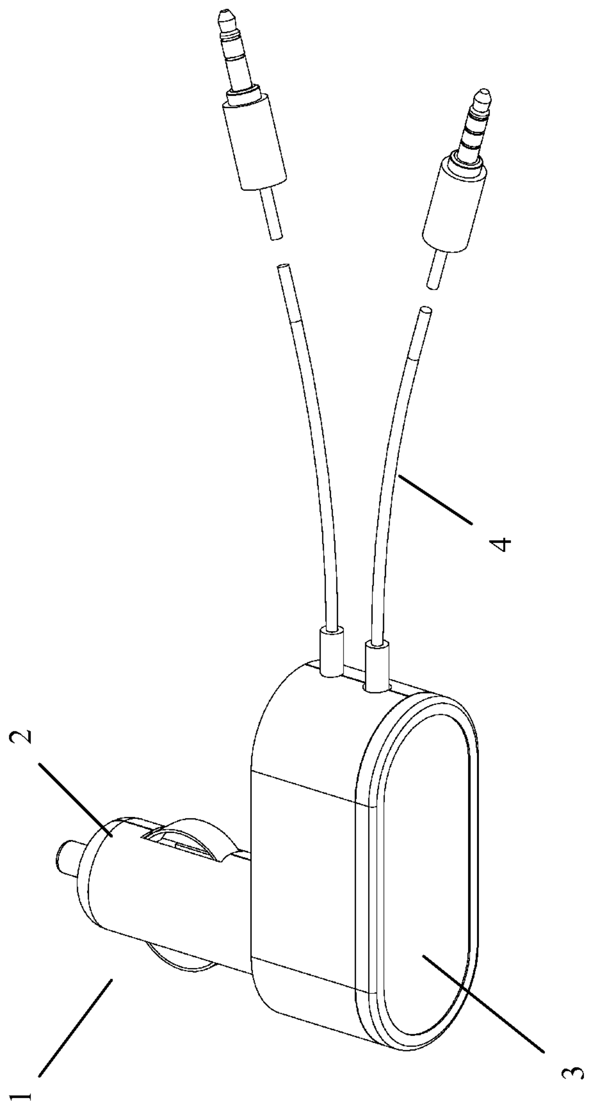
FIG. 2 shows another embodiment of the motion controlled vehicle power adapter.

As shown in FIGS. 1 and 2, in the preferred embodiment the motion controlled vehicle power adapter 1 comprises a vehicle power adapter 2 that can be plugged into the 12V power outlet in a vehicle. It has a remote motion sensor 3 at an end of the vehicle power adapter 2 opposite the end that plugs into the vehicle's power outlet. The remote motion sensor 3 is operated by the operator's hand motions near the sensor without contacting the sensor. The operator's hand motions are translated into control signals and sent to a portable electronic device to control its functions. The control signals may be sent through a wire 4 or wirelessly through a wireless transmitter 5.

Hand motions detected by the remote motion sensor 3 are translated into control signals by the enclosed translation circuit. The direction of the hand motion may translate into different control signals. For example, a waive of the hand in front of the remote motion sensor 3 from left to right may signal track forward. A waive of the hand from right to left may signal track backward. A waive of the hand from top to bottom may signal lowering of the volume. A waive of the hand from bottom to top may signal increase of the volume. Holding the hand in front of the remote motion sensor 3 for a short pause may signal play/pause alternatively. Various combinations of hand motion are possible to send various control signals to the electronic device to perform various functions. All these controls may be performed without looking at the remote motion sensor 3 or physical contacts with the remote motion sensor 3. There are no knobs or buttons to manipulate or press.

In the preferred embodiment, the remote motion sensor 3 comprises of an infrared transmitter and an infrared receiver. The sensor designed and manufactured by Silicone Laboratories Inc. in Austin, Tex., designated Si1120, may be used. The design of this sensor is disclosed in U.S. Pat. No. 5,864,591, U.S. Pat. No. 6,198,118, and U.S. Pat. No. 7,486,386. However, any other suitable short range infrared transmitter and receiver may be used to detect the hand motions. Other suitable remote motion sensors 3 using other detection technologies may also be used. For example, multiple non-contact capacitance sensors may be utilized to detect motion and also direction of motion. Another remote motion sensor 3 that may be suitable is radio transmitter and receiver. Ultrasound transmitter and receiver may also be used to detect hand motions.

Figure 3:
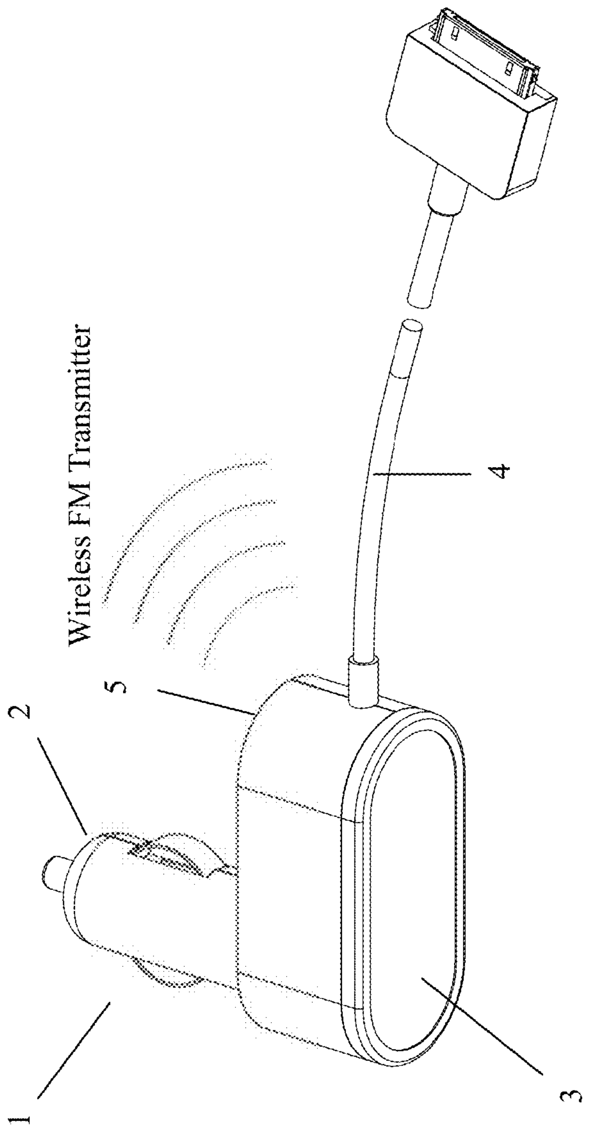
FIG. 3 shows another embodiment of the motion controlled vehicle power adapter using a wireless FM transmitter.

In another embodiment, as shown in FIG. 3, the motion controlled vehicle power adapter 1 uses wireless FM transmitter 5 to send audio signals to the vehicle's radio receiver to enable the audio signals from the portable electronic device to be reproduced through the vehicle's speakers.

Figure 4:
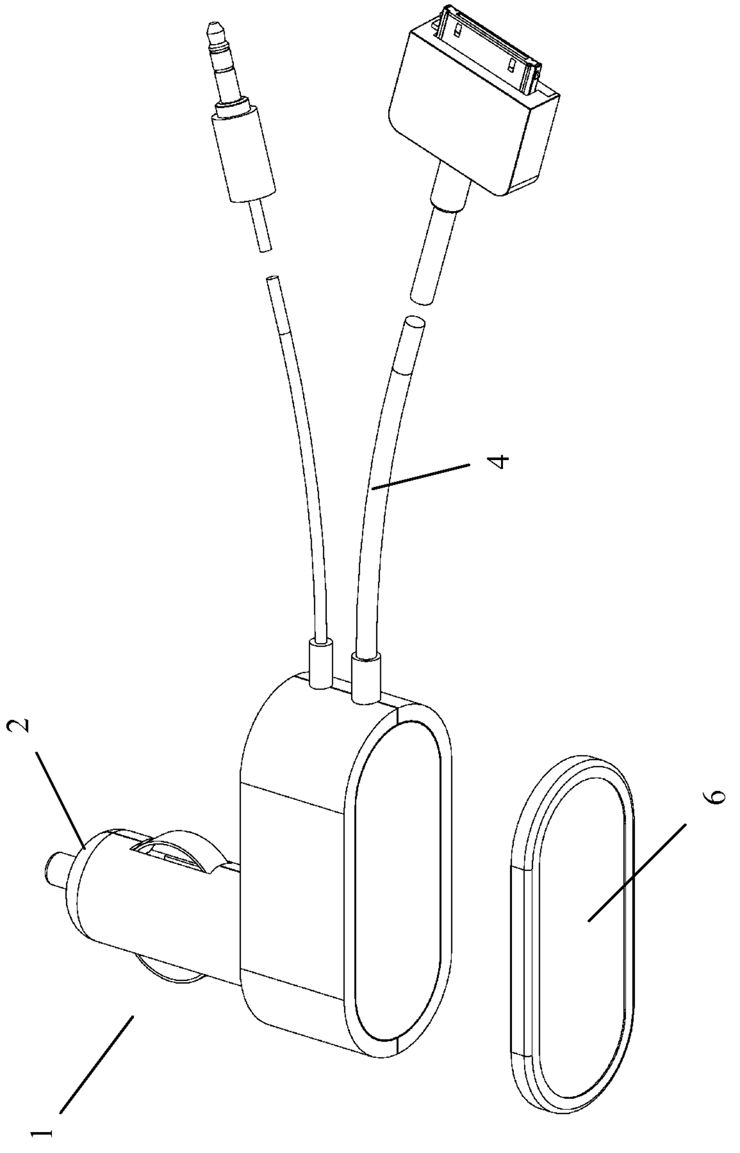
FIG. 4 shows another embodiment of the motion controlled vehicle power adapter with a detachable motion sensor.

In yet another embodiment of the motion controlled vehicle power adapter 1, the remote motion sensor 6 is detachable from the vehicle power adapter 2 as shown in FIG. 4. The remote motion sensor 6 may be connected to the vehicle power adapter 2 with a wire or wirelessly through a wireless transmitter. This enables the remote motion sensor 6 to be placed at any location desired by the operator. The detachable remote motion sensor 6 may be placed on the steering wheel, on the dashboard, or anywhere that is convenient to the operator.

Figure 5:
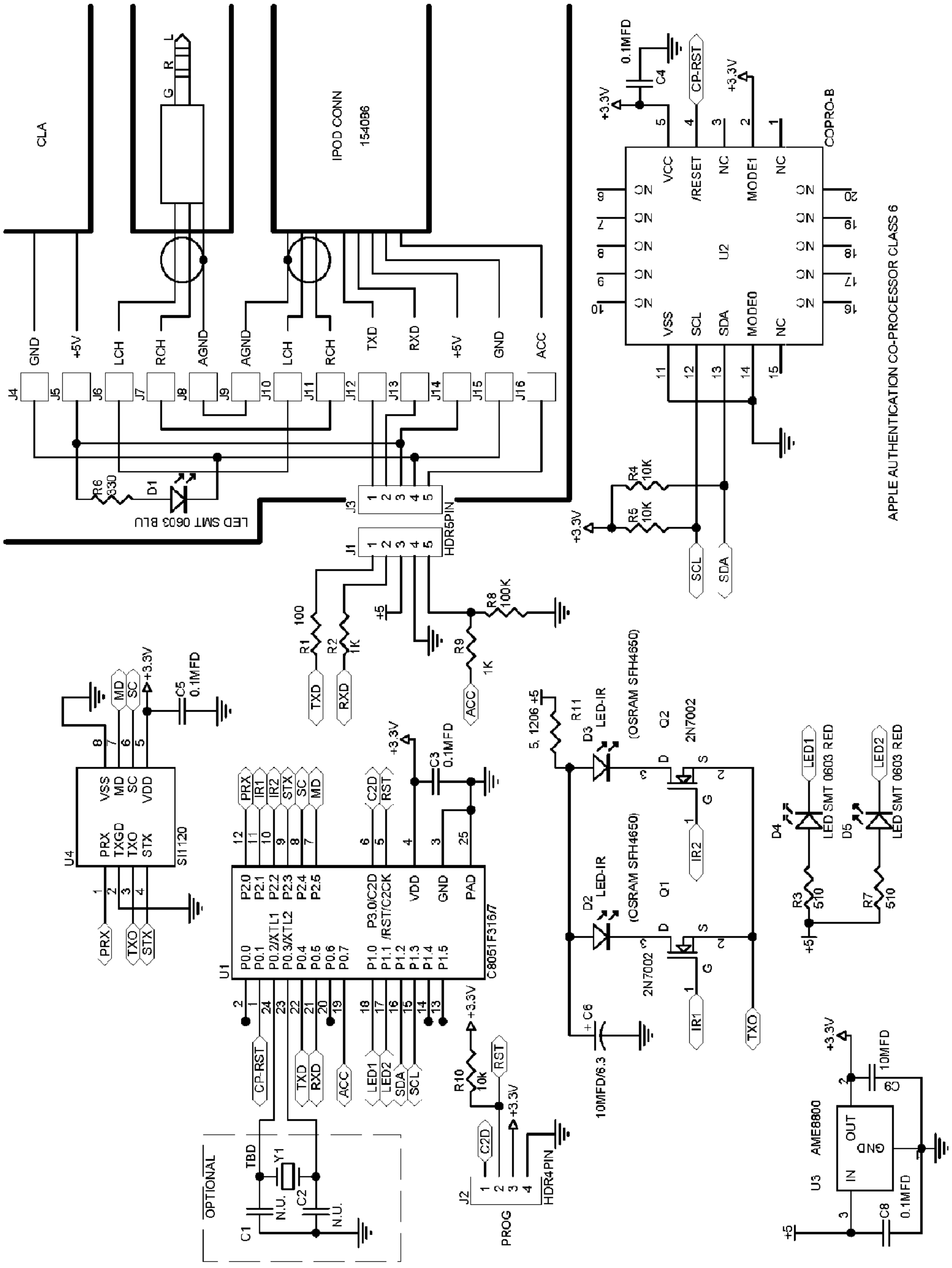
FIG. 5 shows a schematic diagram of the iPod sensor audio.
Figure 6:
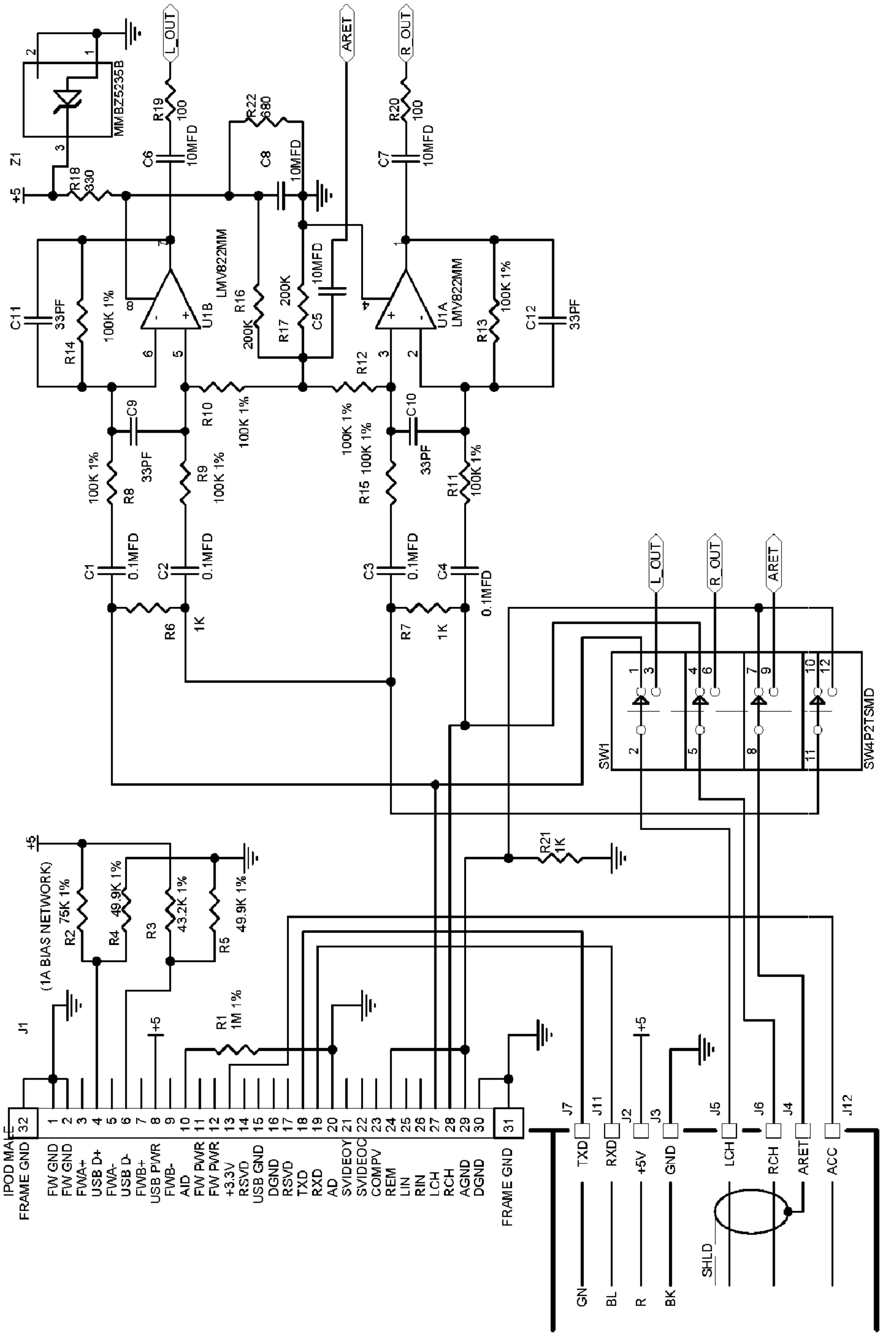
FIG. 6 shows a schematic diagram of the iPod sensor control.

FIG. 5 shows a schematic of an exemplary iPod sensor control. FIG. 6 shows a schematic of an exemplary iPod sensor audio.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A motion controlled vehicle power adapter comprising: a vehicle power adapter without any rechargeable battery that is insertable into a vehicle's power outlet; a remote motion sensor affixed to said vehicle power adapter to detect motion; translation means to translate said detected motion into control signals; and transmission means to transmit said control signal to an electronic device, wherein said remote motion sensor is an infrared transmitter and an infrared receiver.

2. The motion controlled vehicle power adapter as in claim 1 wherein said remote motion sensor is a short range infrared transmitter and a short range infrared receiver.

3. A motion controlled vehicle power adapter comprising: a vehicle power adapter without any rechargeable battery that is insertable into a vehicle's power outlet; a remote motion sensor affixed to said vehicle power adapter to detect motion; translation means to translate said detected motion into control signals; and transmission means to transmit said control signal to an electronic device, wherein said remote motion sensor is a multiple non-contact capacitance sensor to determine a direction of the motion.

4. A motion controlled vehicle power adapter comprising: a vehicle power adapter without any rechargeable battery that is insertable into a vehicle's power outlet; a remote motion sensor affixed to said vehicle power adapter to detect motion; translation means to translate said detected motion into control signals; and transmission means to transmit said control signal to an electronic device, wherein said remote motion sensor is an ultrasound transmitter and receiver.

5. A motion controlled vehicle power adapter comprising:

a vehicle power adapter without any rechargeable battery that is insertable into a vehicle's power outlet;

a remote motion sensor detachable to said vehicle power adapter to detect a motion;

translation means to translate said motion that is detected by said remote motion sensor into a control signal; and transmission means to transmit said control signal to an electronic device.

6. The motion controlled vehicle power adapter as in claim 5 wherein said transmission means is a wireless FM transmitter.

7. The motion controlled vehicle power adapter as in claim 5 wherein said remote motion sensor is wirelessly connected to said vehicle power adapter.

8. The motion controlled vehicle power adapter as in claim 5 wherein said remote motion sensor is an infrared transmitter and an infrared receiver.

9. The motion controlled vehicle power adapter as in claim 5 wherein said remote motion sensor is a short range infrared transmitter and a short range infrared receiver.

10. The motion controlled vehicle power adapter as in claim 5 wherein said remote motion sensor is a multiple non-contact capacitance sensor.

11. The motion controlled vehicle power adapter as in claim 5 wherein said remote motion sensor is a radio transmitter and receiver.

12. The motion controlled vehicle power adapter as in claim 5 wherein said remote motion sensor is an ultrasound transmitter and receiver.

* * * * *